United States Patent
Choi

(10) Patent No.: US 12,375,299 B2
(45) Date of Patent: Jul. 29, 2025

(54) METHOD AND DEVICE FOR PROVIDING BLOCKCHAIN DID-BASED CERTIFICATE DISTRIBUTION SERVICE

(71) Applicant: SWEMPIRE CO., LTD., Goyang-si (KR)

(72) Inventor: Myoung Soo Choi, Goyang-si (KR)

(73) Assignee: SWEMPIRE CO., LTD., Goyang-si (KR)

( * ) Notice: Subject to any disclaimer, the term of this patent is extended or adjusted under 35 U.S.C. 154(b) by 264 days.

(21) Appl. No.: 18/148,182

(22) Filed: Dec. 29, 2022

(65) Prior Publication Data

US 2023/0155843 A1 May 18, 2023

Related U.S. Application Data

(63) Continuation of application No. PCT/KR2022/005553, filed on Apr. 18, 2022.

(30) Foreign Application Priority Data

Apr. 29, 2021 (KR) ........................ 10-2021-0055775

(51) Int. Cl.
*H04L 9/32* (2006.01)
*H04L 9/00* (2022.01)

(52) U.S. Cl.
CPC ............... *H04L 9/3268* (2013.01); *H04L 9/50* (2022.05)

(58) Field of Classification Search
CPC .................................. H04L 9/3268; H04L 9/50
See application file for complete search history.

(56) References Cited

U.S. PATENT DOCUMENTS

| | | | |
|---|---|---|---|
| 9,143,358 B2 | 9/2015 | An et al. | |
| 11,232,234 B2 | 1/2022 | Choi | |
| 11,432,149 B1* | 8/2022 | Dhanoa | .................. G06F 21/36 |
| 11,960,454 B2* | 4/2024 | Latorre | ............... G06F 16/1837 |
| 2013/0110919 A1 | 5/2013 | An et al. | |
| 2013/0117400 A1 | 5/2013 | An et al. | |
| 2018/0262493 A1* | 9/2018 | Andrade | ................. G06F 21/30 |
| 2020/0211409 A1* | 7/2020 | Latorre | .................. G16H 10/60 |
| 2021/0184850 A1* | 6/2021 | Shpurov | ............... H04L 9/3247 |
| 2021/0256505 A1* | 8/2021 | Peng | ..................... H04L 9/0894 |
| 2021/0312088 A1 | 10/2021 | Choi | |
| 2021/0349882 A1* | 11/2021 | Basak | .................. G06F 16/211 |
| 2021/0365544 A1* | 11/2021 | Malin | ................... H04L 9/0819 |
| 2022/0006651 A1* | 1/2022 | Soundararajan | .... H04W 12/069 |

(Continued)

FOREIGN PATENT DOCUMENTS

| | | |
|---|---|---|
| KR | 10-2012-0005392 A | 1/2012 |
| KR | 10-2013-0040461 A | 4/2013 |

(Continued)

OTHER PUBLICATIONS

International Search Report issued in PCT/KR2022/005553; mailed Jul. 25, 2022.

*Primary Examiner* — Techane Gergiso
(74) *Attorney, Agent, or Firm* — Studebaker Brackett PLLC

(57) ABSTRACT

The present disclosure relates to a method and a device for providing a blockchain DID-based certificate distribution service, whereby a certificate can be combined with a form and thereby used as a certificate to be submitted, to an individual or a corporation, for a specific order of business.

2 Claims, 3 Drawing Sheets

(56) References Cited

U.S. PATENT DOCUMENTS

| | | | | |
|---|---|---|---|---|
| 2022/0122170 A1* | 4/2022 | Du | .................. | H04L 9/0869 |
| 2023/0377700 A1* | 11/2023 | Andreina | .............. | H04L 9/3239 |
| 2024/0054204 A1* | 2/2024 | Park | .................. | H04L 65/40 |
| 2024/0185994 A1* | 6/2024 | Kim | .................. | G16H 10/40 |

FOREIGN PATENT DOCUMENTS

| | | |
|---|---|---|
| KR | 10-2020-0041148 A | 4/2020 |
| KR | 10-2020-0067282 A | 6/2020 |
| KR | 10-2020-0078295 A | 7/2020 |
| KR | 10-2226619 B1 | 3/2021 |

* cited by examiner

METHOD AND DEVICE FOR PROVIDING BLOCKCHAIN DID-BASED CERTIFICATE DISTRIBUTION SERVICE

CROSS-REFERENCE TO RELATED APPLICATIONS

The present application is a continuation of International Patent Application No. PCT/KR2022/005553, filed on Apr. 18, 2022, which is based upon and claims the benefit of priority to Korean Patent Application No. 10-2021-0055775 filed on Apr. 29, 2021. The disclosures of the above-listed applications are hereby incorporated by reference herein in their entirety.

BACKGROUND

Embodiments of the inventive concept described herein relate to a method and a device for providing a blockchain DID-based certificate distribution service, and more particularly, relate to a method and a device for providing a blockchain DID-based certificate distribution service that issues and provides a certificate for proving the identity or qualification so as to be appropriate for a form of a submission agency.

With the development of Internet services, most people use the following on-line services through the Internet: a government agency, an educational institution, a medical institution, a telecommunication company, a financial company, a passenger company, asset management, credit information, portal, a social network service (SNS), a game, shopping, ticketing, home delivery, and electronic voting.

Accordingly, a user who wants to use the service has to register as a member by inputting personal information including his/her real name or has to enter a specific ID and password to authenticate that he or she is a registered user. However, because it is quite cumbersome to repeat the authentication procedure for each site, nowadays, a manner called "simple authentication" is being developed to allow the user to conduct financial transaction easily on the Internet through the simpler log-in.

Conventionally, the user authentication has been performed with a centralized identify (ID) system; typically, a public certificate and an "Active X" program for using the public certificate are installed or are installed through a separate application performing authentication, and the authentication is performed through the program or application.

However, in the case of the centralized identity verification system, the personal information is leaked out or abused.

Also, in the case of verifying the user's identity by using the above program or application, the installation of the separate program is required, and there is a problem in the compatibility with the existing application or program. In other words, it is difficult to verify the user's identity smoothly.

Nowadays, the DID (Decentralized IDentifiers) technology that allows a user to verify his/her identity through an issuing entity is in the spotlight.

However, like DID, identity and qualification information that an information subject receives and manages from the identity or qualification information management institution may be used only for the purpose of confirming the identity or qualification of the data subject at a specific time and is incapable of being utilized as a certificate for submission to an individual or a corporation for a specific task. The reason is that an ordinary certificate has to be combined with a designated form through a given procedure complying with regulations (or laws or rules) for issuing the certificate.

Accordingly, there is a need to develop a technology that combines the certificate with the form based on the blockchain DID so as to be utilized as a certificate for submission to an individual or a corporation for a specific task.

SUMMARY

Embodiments of the inventive concept provide a method and a device for providing a blockchain DID-based certificate distribution service, which combines a certificate with a form so as to be utilized as a certificate for submission to an individuals or a corporation for a specific task.

According to an embodiment, a method for providing a blockchain DID-based certificate distribution service, which is performed by a system including a user terminal, a service server, and an institution server of a management institution may include transmitting, at the user terminal, issuance request information of the selected certificate to the service server, when at least one of a plurality of certificates issuable is selected by a user, the issuance request information including a kind of the selected certificate and personal information of the user, checking, at the service server, the management institution to issue a certificate according to the received issuance request information, when the issuance request information is received, encrypting, at the service server, the issuance request information in a preset scheme, transmitting, at the service server, the encrypted issuance request information and decryption information of the encrypted issuance request information to the institution server of the checked management institution, the decryption information being information for decrypting the encrypted issuance request information or information necessary to check or obtain the information for decrypting the encrypted issuance request information, decrypting, at the institution server, the encrypted issuance request information based on the decryption information to determine whether the issuance request information is valid, searching for, at the institution server, verification information corresponding to the certificate kind in the decrypted issuance request information among a plurality of verification information stored in advance and checking form information for creating a final certificate based on the found verification information, when the check result indicates that there is validity, and creating the final certificate by applying the verification information to a form corresponding to the checked form information.

According to an embodiment, a method for providing a blockchain DID-based certificate distribution service, which is performed by a system including a user terminal, a service server, and an institution server of a management institution may include transmitting, at the user terminal, issuance request information of the selected certificate to the service server when at least one of a plurality of certificates issuable is selected by a user, the issuance request information including a kind of the selected certificate and personal information of the user, checking, at the service server, the management institution to issue a certificate according to the received issuance request information and form information for creating a final certificate, when the issuance request information is received, encrypting, at the service server, the issuance request information in a preset scheme, transmitting, at the service server, the encrypted issuance request information and decryption information of the encrypted issuance request information to the institution server of the checked management institution, the decryption information being information for decrypting the encrypted issuance request information or information necessary to check or obtain the information for decrypting the encrypted issuance request information, decrypting, at the institution server, the encrypted issuance request information based on the decryption information to determine whether the issuance request information is valid, searching for verification information corresponding to the certificate kind in the decrypted issuance request information among a plurality of verification information stored in advance so as to be transmitted to the service server, when the check result indicates that there is validity, and creating, at the service server, the final certificate by applying the received verification information to a form corresponding to the checked form information, when the verification information is received from the institution server.

According to an embodiment, a blockchain DID-based certificate distribution service providing device may include a communication unit that transmits and receives data for providing a certificate issuance service, wherein the communication unit receives issuance request information requesting issuance of a final certificate from a user terminal, the issuance request information including a kind of the selected certificate and personal information of the user, creates and transmits the final certificate in response to the received issuance request information, transmits an encrypted issuance request information to an institution server, and receives verification information for creating the final certificate in response to the transmitted issuance request information, a storage unit that stores the data for providing the certificate issuance service, the data including information about a plurality of certificates issuable, information about a management institution to issue each of the plurality of certificates, form information of each of the plurality of certificates, and a form corresponding to the form information, and a controller. When the issuance request information is received from the user terminal, the controller checks the management institution to issue a certificate according to the received issuance request information and form information for creating the final certificate, encrypts the received issuance request information in a preset scheme, transmits the encrypted issuance request information to an institution server of the checked management institution together with decryption information, and creates, when verification information is received from the institution server, the final certificate by applying the received verification information to a form corresponding to the checked form information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
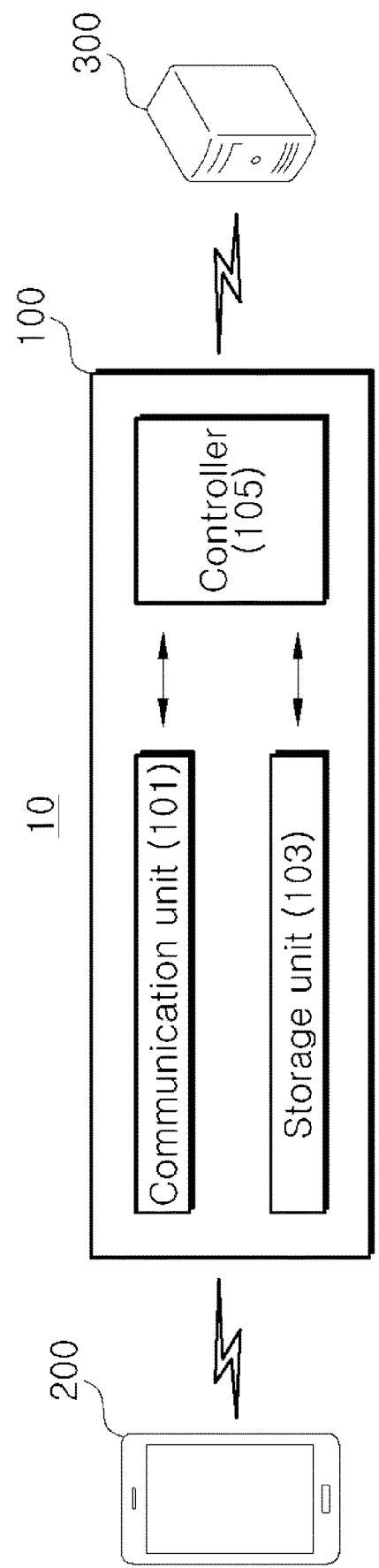
FIG. 1 is a diagram illustrating a configuration of a blockchain DID-based certificate distribution service providing system according to an embodiment of the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

As illustrated in the figures, spatially relative terms, such as "below", "beneath", "lower", "above", "upper", and the like, may be used herein for ease of description to describe the relationship between one component and other components. It will be understood that the spatially relative terms are intended to encompass different orientations of the components in use or operation in addition to the orientation depicted in the figures. For example, when inverting a component shown in the figures, a component described as "below" or "beneath" of another component may be placed "above" another element. Thus, the exemplary term "below" may include both downward and upward directions. The components may also be oriented in different directions, and thus the spatially relative terms may be interpreted depending on orientation.

The term "unit" or "module" used herein may refer to software or hardware such as field programmable gate array (FPGA) or application specific integrated circuit (ASIC), and the "unit" or "module" may perform some functions. However, the "unit" or "module" may not be limited to software or hardware. The "unit" or "module" may be configured to exist in an addressable storage medium or may be configured to operate one or more processors. Therefore, as an example, "units" or "module" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" or modules and elements may be combined into a smaller number of "units" or modules and elements or may be divided into additional "units" or modules and elements.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Below, embodiments of the inventive concept will be described in detail with reference to accompanying drawings.

FIG. 1 is a diagram illustrating a configuration of a blockchain DID-based certificate distribution service providing system according to an embodiment of the inventive concept.

Referring to FIG. 1, a blockchain DID-based certificate distribution service providing system according to an embodiment of the inventive concept may include a service server 100, a user terminal 200, and an institution server 300.

Service Server (100)

When the user terminal 200 requests to provide a certificate issuance service, the service server 100 may check an institution to issue (or manage) verification (or proof) information to be included in a relevant certificate and may request the institution server 300 being a server of a relevant institution to issue the certificate; in this case, the certificate may be transmitted to a submission agency (or a destination) intending to submit the certificate. In this case, according to a first embodiment, the institution server 300 may create the certificate so as to be transmitted to the submission agency; according to a second embodiment, the service server 100 may receive the verification information for creating the certificate from the institution server 300, may create the certificate based on the verification information, and may transmit the certificate to the submission agency.

To this end, the service server 100 may include a communication unit 101, a storage unit 103, and a controller 105.

First, the first embodiment will be described. The communication unit 101 may transmit and receive data for providing the certificate issuance service; for example, the communication unit 101 receives issuance request information requesting to issue the certificate from the user terminal 200 and transmits encrypted issuance request information to the institution server 300. Herein, the issuance request information may include at least one of a kind of a certificate selected by a user from among a plurality of certificates, information about a destination to which the final certificate issued is to be transmitted, and personal information of the user; in this case, at least one of the plurality of certificates may be selected by the user.

The storage unit 103 may store data for providing the blockchain DID-based certificate distribution service; for example, the storage unit 103 may store at least one of information about a plurality of issuable certificates, information about a management institution to issue (or manage) each certificate, form information of each certificate, and a form corresponding to each form information.

When the issuance request information is received from the user terminal 200, the controller 105 may check the management institution to issue a certificate according to the received issuance request information; under control of the controller 105, the received issuance request information may be encrypted (or encoded) and may then be transferred to the institution server 300 thus checked. Herein, the issuance request information may be encrypted in a preset scheme, and the encrypted issuance request information may be transmitted to the institution server 300 together with decryption information including information that is necessary to decrypt (or decode) the encrypted issuance request information.

However, when a form providing request is received from the institution server 300, the controller 105 may transmit a form stored in advance in the storage unit 103 to the institution server 300 as a response thereto such that the certificate is created; when the controller 105 receives the verification information from the institution server 300, the controller 105 may create the certificate by applying the received verification information to the form stored in advance in the storage unit 103 as a response thereto and may transmit the certificate thus created to the submission agency.

As such, the institution server 300 may obtain the issuance request information by decrypting the encrypted issuance request information by using the decryption information; when the issuance request information is valid, the institution server 300 may create the certificate by searching for the verification information and applying the verification information to a relevant form. In this case, the form may refer to a form that is specified by a submission agency to which the created certificate is to be submitted.

Meanwhile, the second embodiment will be described. The communication unit 101 may transmit and receive data for providing the blockchain DID-based certificate distribution service; for example, the communication unit 101 receives the issuance request information requesting to issue the certificate from the user terminal 200 and creates and transmits the final certificate as a response thereto, and the communication unit 101 transmits the encrypted issuance request information to the institution server 300 and receives the verification information for creating the final certificate as a response thereto. Herein, the issuance request information may include at least one of a kind of a certificate selected by a user from among a plurality of certificates, information about a destination to which the final certificate issued is to be transmitted, and personal information of the user; in this case, at least one of the plurality of certificates may be selected by the user.

The storage unit 103 may store data for providing the blockchain DID-based certificate distribution service; for example, the storage unit 103 may store at least one of information about a plurality of issuable certificates, information about a management institution to issue (or manage) each certificate, form information of each certificate, and a form corresponding to each form information.

When the issuance request information is received from the user terminal 200, the controller 105 checks a management institution to issue a certificate according to the received issuance request information and form information for creating the certificate, encrypts the received issuance request information in a preset scheme, and transmits the encrypted issuance request information to an institution server of the checked management institution together with decryption information; after the verification information is received the transmitted management institution, the controller 105 creates the certificate by applying the received verification information to a form corresponding to the above form information. The certificate thus created may be transmitted to the submission agency.

The communication unit 101 described above is for communicating with the user terminal 200, the institution server 300, or any other devices and is configured to transmit and receive a wireless signal over a communication network complying with wireless Internet technologies.

The wireless Internet technologies include, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), etc., and the service server 100 transmits and receives data based on at least one wireless Internet technology within a range including Internet technologies not listed above.

Short range communication may be supported by using at least one of short range communication technologies such as Bluetooth™, RFID (Radio Frequency Identification), infrared data association (IrDA), UWB (Ultra-Wideband), Zig-Bee, NFC (Near Field Communication), wireless-fidelity (Wi-Fi), Wi-Fi Direct, and wireless universal serial bus (USB) technologies. The wireless communication between the service server 100 and the user terminal 200 may be supported over wireless area networks. In this case, the wireless area networks may be wireless personal area networks.

User Terminal (200)

The user terminal 200 may be a terminal that uses for the user to receive the blockchain DID-based certificate distribution service; the user may request blockchain DID-based certificate distribution by selecting at least one certificate, which he or she wants, of a plurality of issuable certificates by using the user terminal 200 and transmitting the issuance request information including information about the at least one certificate thus selected to the service server 100. Herein, the issuance request information may further include DID (Decentralized IDentifiers) being an identifier of a specific entity.

The user terminal 200 may receive the blockchain DID-based certificate distribution service by installing a separate program or application or connecting to a webpage.

In detail, the user terminal 200 may include a mobile terminal, a mobile phone, a smartphone, a laptop computer, a digital broadcasting terminal, personal digital assistants (PDA), a portable multimedia player (PMP), a navigation device, a slate PC, tablet PC, an ultrabook, a wearable device (e.g., a watch-type terminal (i.e., a smartwatch), a glass-type terminal (i.e., smart glasses), a head mounted display (HMD)), etc.

However, it may be easily understood by one skilled in the art that the user terminal 200 according to an embodiment of the inventive concept may also be applied to stationary terminals such as a digital TV, a desktop computer, and a digital signage, except for the case where the user terminal 200 is applicable only to a mobile terminal.

Institution Server (300)

The institution server 300 issues a plurality of certificates, and to this end, the institution server 300 stores and manages authentication information about a user included in each certificate. When the encrypted issuance request information is received from the service server 100, the institution server 300 determines whether it is possible to issue a relevant certificate, by decrypting the encrypted issuance request information by using the decryption information and then checking (or verifying) the validity of information included in the issuance request information. When a determination result indicates that the issuance is possible, the institution server 300 searches for verification information corresponding to a certificate type and checks form information for creating the certificate with the found verification information.

When a check result indicates that the form exists, the institution server 300 generates the certificate by applying the found verification information to the checked form. To this end, the institution server 300 may include form information for each of a plurality of certificates and a form corresponding to each form information.

In contrast, when the check result indicates that the form does not exist, the institution server 300 may receive a relevant form from the service server 100 and may create the certificate by applying the verification information to the form or may transmit the verification information to the service server 100 such that the service server 100 directly creates the certificate.

Below, the first embodiment and the second embodiment will be described in detail with reference to FIGS. 2 and 3.

Figure 2:
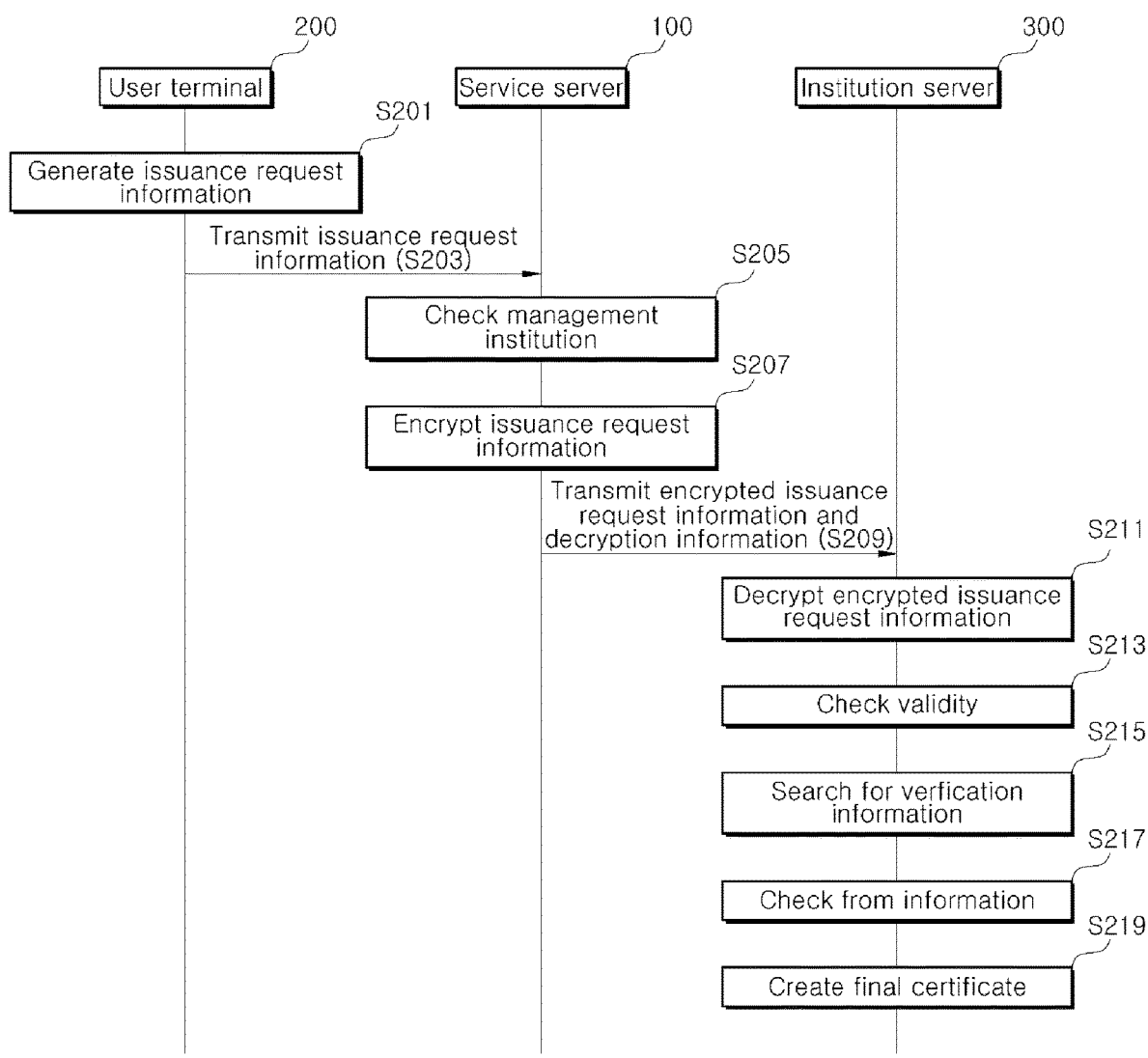
FIG. 2 is a flowchart illustrating a blockchain DID-based certificate distribution service providing method according to an embodiment of the inventive concept.

FIG. 2 is a flowchart illustrating a blockchain DID-based certificate distribution service providing method according to an embodiment of the inventive concept and is associated with the first embodiment described above.

Referring to FIG. 2, when at least one of a plurality of certificates is selected by the user, the user terminal 200 generates the issuance request information that includes information about the at least one certificate thus selected and personal information of the user (S201). In detail, the user terminal 200 displays a certificate list including the plurality of certificates in the form of a text or an image so as to be selected by the user, and the user selects at least one certificate, which the user wants, from the text or image thus displayed. Herein, the issuance request information may include the personal information of the user described above, and a disclosure range of the personal information included in the certificate may be additionally designated (or set). The designated information may include whether to disclose a name, whether to disclose a resident registration number, whether to disclose a sex, whether to disclose any other personal identification information, etc. Also, the issuance request information may include destination information to which the final certificate issued is to be transmitted; afterwards, the control may be made such that the final certificate issued by the service server 100 or the institution server 300 may be directly submitted to a relevant destination based on the destination information.

Afterwards, the user terminal 200 requests the issuance of the certificate by transmitting the generated issuance request information to the service server 100 (S203).

When the issuance request information is received from the user terminal 200, the service server 100 checks a kind of the at least one certificate and a management institution of the at least one certificate based on the received issuance request information (S205) and encrypts the received issuance request information in a preset scheme (S207).

Afterwards, the service server 100 transmits the encrypted issuance request information and decryption information including information, which is necessary to decrypt the encrypted issuance request information, to a server of the management institution checked in operation S205 (S209).

Herein, the decryption information may include information necessary to decrypt the encrypted issuance request information or may include information for checking or obtaining the information necessary to decrypt the encrypted issuance request information.

The institution server 300 decrypts the encrypted issuance request information from the service server 100 by using the decryption information (S211) and determines whether the decrypted issuance request information is valid, that is, whether it is possible to issue the certificate (S213).

When a check result indicates that there is no validity, although not illustrated in FIG. 2, the institution server 300 may transmit a message indicating that it is impossible to issue the certificate or may ignore the issuance request without a response.

When the check result indicates that there is validity, the institution server 300 searches for verification information corresponding to the certificate kind in the issuance request information decrypted in operation S211 from among a plurality of verification information stored in advance (S215) and checks form information for creating the final certificate based on the found verification information (S217).

Afterwards, the institution server 300 creates the final certificate by applying the verification information found in operation S215 to a form corresponding to the checked form information (S219).

Although not illustrated in FIG. 2, when the form information for creating the final certificate based on the found verification information is not checked in operation S217, the institution server 300 may be provided with the form from the service server 100 and may create the final certificate by applying the verification information found in operation S215 to the form (S219). When destination information to which the final certificate is to be transmitted is included in the issuance request information, the institution server 300 may be provided with the form from the destination and may create the final certificate by applying the verification information found in operation S215 to the form (S219).

Meanwhile, the institution server 300 may submit the final certificate created in operation S219 to the destination by using the destination information or may transmit the final certificate to the user terminal 200.

Meanwhile, when the check result in operation S213 indicates that it is possible to issue only some of the plurality of certificates requested for issuance, the issuance procedure, that is, operation S215 to operation S219 is performed only on some of the plurality of certificates.

Figure 3:
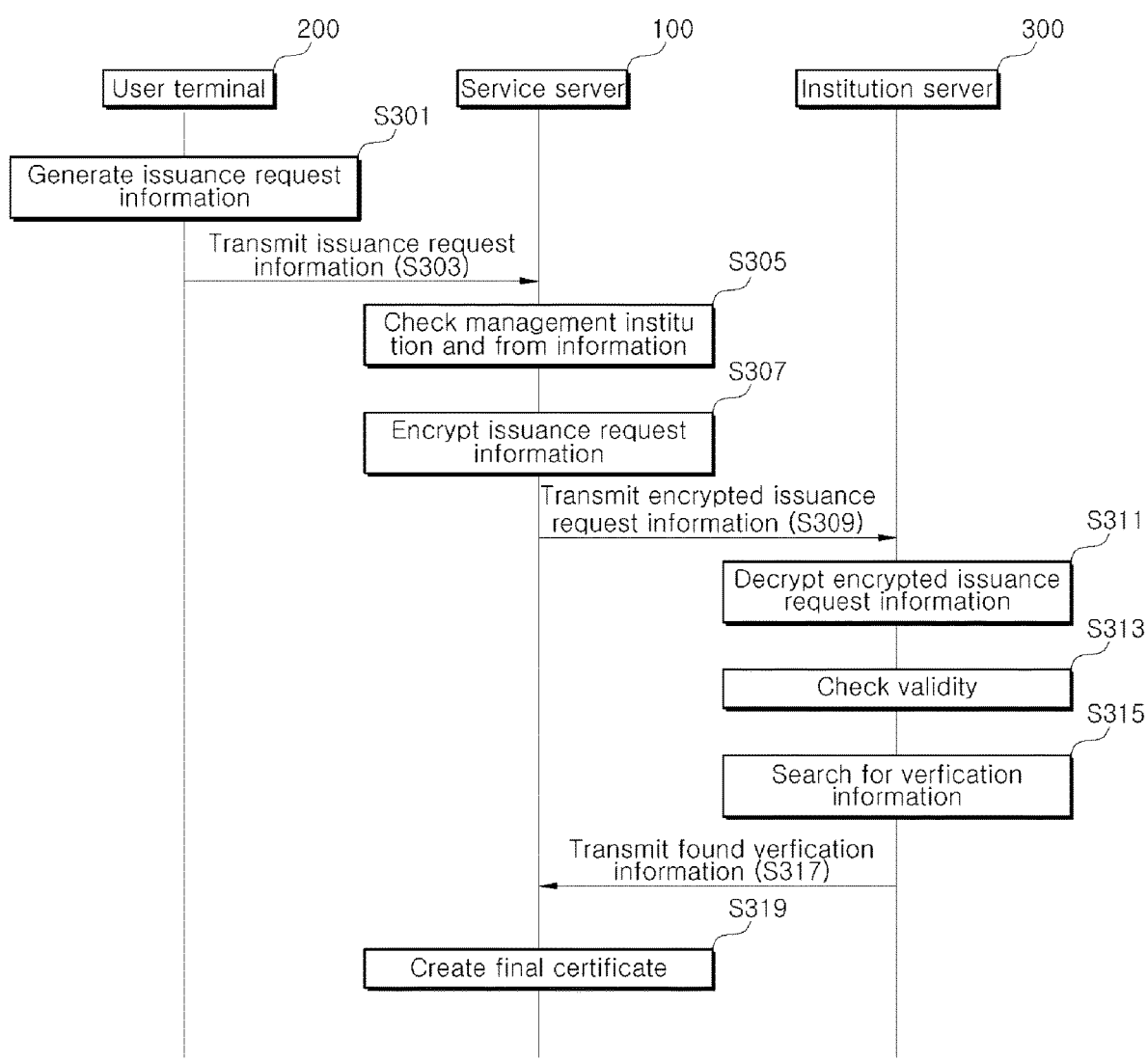
FIG. 3 is a flowchart illustrating a blockchain DID-based certificate distribution service providing method according to another embodiment of the inventive concept.

FIG. 3 is a flowchart illustrating a blockchain DID-based certificate distribution service providing method according to another embodiment of the inventive concept and is associated with the second embodiment described above.

Referring to FIG. 3, operation S301 to operation S315 are similar to operation S201 to operation S217 of FIG. 2, and thus, additional description will be omitted to avoid redundancy. However, in the case of the second embodiment, in operation S305, as well as the management institution, form information corresponding to the certificate kind is further checked based on the issuance request information.

After operation S315, the institution server 300 transmits the found verification information to the service server 100 (S317), and the service server 100 creates the final certificate by applying the verification information received in operation S317 to a form corresponding to the form information checked in operation S305 (S319).

Meanwhile, the first embodiment and the second embodiment may be applied in the form of a combination. For example, when the check result in operation S217 indicates that the form information is checked, the institution server 300 may create the final certificate by using the form corresponding to the checked form information (S219); when the check result in operation S217 indicates that the form information is not checked, the institution server 300 may transmit the verification information found in operation S215 to the service server 100 (S317), and the service server 100 may create the final certificate (S319).

Operations of the method or algorithm described with regard to the embodiments of the inventive concept may be directly implemented with hardware, may be implemented with a software module executable by the hardware, or may be implemented in the form of a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or any other computer-readable recording medium well known to the art.

According to the inventive concept, it is possible to utilize a combination of a certificate and a form as a certificate for submission to an individuals or a corporation for a specific task.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing a blockchain Decentralized Identifiers (DID)-based certificate distribution service, which is performed by a system including a user terminal, a service server, and an institution server of a management institution, the method comprising:
   when at least one of a plurality of issuable certificates is selected by a user, transmitting, by the user terminal, issuance request information of the selected certificate to the service server, wherein the issuance request information includes the DID, a type of the selected certificate, personal information of the user, and destination information of a final certificate,
   wherein the transmitting the issuance request information comprises:
      setting, by the user terminal, whether to disclose one or more particular information included in the personal information; and
      updating, by the user terminal, the issuance request information to include information of the setting;
   when the issuance request information is received,
   checking, by the service server, a validity of the management institution that is to issue a certificate according to the received issuance request information;
   encrypting, by the service server, the issuance request information in a preset scheme;
   transmitting, by the service server, the encrypted issuance request information and decryption information of the encrypted issuance request information to the institution server of the checked management institution,
   wherein the decryption information includes first information to be used to decrypt the encrypted issuance request information or includes second information to be used to obtain the first information,
   decrypting, by the institution server, the encrypted issuance request information, based on the decryption information, and determining, by the institution server, whether the issuance request information is valid, based on decrypted issuance request information;

when the institution server determines that the issuance request information is valid, searching, by the institution server, from a plurality of verification information stored in the institution server, particular verification information corresponding to the type of the selected certificate, indicated in the decrypted issuance request information, and checking, by the institution server, whether format information to be used to create the final certificate is stored in the institution server, based on the particular verification information;

when the format information is not stored in the institution server, transmitting, by the institution server, the particular verification information to the service server, and creating, by the service server, the final certificate;

when the format information is stored in the institution server, creating, by the institution server, the final certificate by applying the particular verification information to a form corresponding to the format information, and applying the information of the setting to the final certificate;

after the creating, by the institution server, performing signatures with certificates of the user terminal and the institution server, respectively, for verifying that the final certificate is an original certificate; and transmitting, by the service server or the institution server, the final certificate issued by the service server or the institution server to a destination indicated in the destination information, and storing, by the service server or the institution server, a transmission history.

2. The method of claim 1, wherein the creating, by the institution server, comprises:

creating the final certificate based on at least one file format, and wherein the verification information to be included in the final certificate is generated as metadata capable of being utilized as data.

\* \* \* \* \*